(12) United States Patent
Paulus

(10) Patent No.: US 7,749,033 B1
(45) Date of Patent: Jul. 6, 2010

(54) AMPHIBIOUS SURFACE VEHICLE WITH SYNCHRO-PHASED ROTARY ENGAGEMENT DEVICES

(76) Inventor: Gary Lee Paulus, 11720 Birch Trail Cir. Unit A, Anchorage, AK (US) 99515

( * ) Notice: Subject to any disclaimer, the term of this patent is extended or adjusted under 35 U.S.C. 154(b) by 0 days.

(21) Appl. No.: 12/317,620

(22) Filed: Dec. 24, 2008

(51) Int. Cl.
*B63H 19/08* (2006.01)

(52) U.S. Cl. ........................ 440/12.5; 180/7.1

(58) Field of Classification Search ................ 440/12.5, 440/12.53, 12.54, 12.56; 180/6.2, 7.1, 23, 180/24.01, 24.06, 24.07, 24.08, 24.11, 24.12
See application file for complete search history.

(56) References Cited

U.S. PATENT DOCUMENTS

| | | | | |
|---|---|---|---|---|
| 2,256,570 | A | * | 9/1941 | Kopcxynski ................ 180/7.1 |
| 2,786,540 | A | * | 3/1957 | Sfredda ........................ 180/7.1 |
| 2,790,503 | A | * | 4/1957 | Kopczynski ................ 180/7.1 |
| 2,819,767 | A | * | 1/1958 | Kopczynski ................ 180/7.1 |
| 4,817,747 | A | * | 4/1989 | Kopczynski ............. 180/24.08 |
| 5,881,831 | A | * | 3/1999 | Harvey ........................ 180/6.2 |

* cited by examiner

*Primary Examiner*—Lars A Olson
(74) *Attorney, Agent, or Firm*—Michael J. Tavella

(57) ABSTRACT

This invention is directed to a novel amphibious surface vehicle (10) having a hull like chassis (11) with a plurality of rotary engagement devices (14) adapted for travel over various surface terrains and fluidic substances (17). Each engagement device includes rotors (16) having a multi-lobular periphery that provides improved tractive and propulsive attributes. The rotors are coupled through a driven eccentric hub (30) and phased by a non-circular internal gear pair (27, 37) so as to provide synchronized linear motion upon a weight bearing surface (15). The rotors with an overlapping contact ratio which produces increased traction and bearing area translating to improved overall performance upon a planar surfaces (15). This overlapping action becomes more paddle like when surface penetration occurs or by adjusting lever (19) aggressively changing the phasing incidence of the rotors (16), which is conducive to fluidic propulsion on water or other low shear strength substances (17).

25 Claims, 5 Drawing Sheets

AMPHIBIOUS SURFACE VEHICLE WITH SYNCHRO-PHASED ROTARY ENGAGEMENT DEVICES

CROSS-REFERENCED TO RELATED APPLICATIONS

None.

FEDERALLY SPONSORED RESEARCH

None.

SEQUENCE LISTING

None.

BACKGROUND OF THE INVENTION

1. Field of Invention

This invention relates to engagement devices for amphibious surface vehicles, particularly for such devices to be operated in tractive and/or propulsive modes over varying terrain attributes, surface conditions, and though substances exhibiting high fluidity characteristics.

2. Prior Art

The current art of surface transport vehicles utilized numerous types of engagement devices such as, wheels, endless tracks, steppers, articulating members, and rails. Such transport devices perform adequately within their respective surface domains, however struggle and become cumbersome when transitioning to other surfaces beyond their intended operational envelopes.

For example, this is typical of conventionally wheeled vehicles transitioning from a developed road bed to dry sand, loose gravel, or moisture saturated soils resulting in the shear failure of the surface, thus penetrating therein. This usually results in the loss of forward momentum and available traction, thus becoming completely immobilized within the surface encountered. A method to alleviate this problem as found in the construction, mining, agriculture and timber industries which commonly utilize large wheel diameters and widths to increase the contact area or footprint to aforesaid unimproved surfaces. This approach reduces the ground pressure exerted therefore lowering the shearing forces imposed to the underlying terrain.

The efficient mobility of a wheeled surface vehicle is dependant on several factors: slope of the surface (grade), internal wheel friction, contact friction (grip) and rolling resistance. The latter is directly related to the amount of deformation of the wheel and the load bearing surface when in contact, thus creating this additional resistance. Rolling resistance is analogous to ascending a constant positive slope and when this slope is combined to the actual grade, it can overcome the provided traction (grip), thus spinning occurs. Also, rolling resistance requires additional power and torque to overcome due to continuously traversing this added slope thus more fuel consumption and the loss of available pulling force. To reduce rolling resistance by distributing the load to a greater contact area thus increasing traction and decreasing penetration into the ground surface results in greater efficiency and effective pulling power. This is the rationale in the industries mention above, but a scalability limit is soon reached with very large diameter wheels, by sacrificing torque or rotational leverage (rim-pull), thus insufficient power to pull or haul a payload over yielding surface conditions.

Another terrain engagement device that brings the surface along with it, such as a track laying vehicle, which nearly negates rolling resistance by providing a large contact area, thus limiting penetration. Also, track laying vehicles are very agile in steep terrain more so than conventionally wheeled devices by generating large amounts of traction and leverage or drawbar pull which is analogous to wheel rimpull mentioned above. They can negotiate low ground pressure areas due to low downward forces exerted by employing wide tracks thus reduce yielding effects of the underlying surface. A critical tradeoff occurs though, with tracked vehicles in performance in speed, therefore not an effective conveyance on improved, hard or paved surfaces where higher velocities can be attained by wheeled vehicles. Albeit, tracks are very robust, they have other major drawbacks such as a very short service life, a high maintenance schedule, continual part replacement, and prohibitive energy consumption. Also, a multi-linked track or chain is as strong as its weakest link and this is the 'Achilles Heel' of track laying or endless track vehicles were redundancy is paramount, such as with military, search rescue, and remote operations.

However, the vehicle performance envelope can be expanded by combining various terrain engagement systems in complimentary configurations. This usually is impractical and creates unneeded complexity and expenses with the same inherent disadvantages mentioned above. Several prior art vehicles utilize such methods and have only found limited success. Also, amphibious vehicles may utilize auxiliary propulsion devices when waterborne. These propulsion devices range from screw propellers, water jets, paddle wheels, or ducted fans such as with hovercraft. By just utilizing a single propulsive drive device to do both surface engagement and to impel thrust, would greatly simplify the operation and cost of the vehicle.

The following prior art will described several of the numerous innovations to overcome some of the disadvantages mentioned above Harvey, in U.S. Pat. No. 5,881,831 teaches a multi-terrain amphibious vehicle adapted for travel across various types and attributes. The vehicle includes a chassis assembly which extends in a longitudinal direction; a plurality of propulsion members rotatably coupled to the chassis assembly for propelling the vehicle across a given surface; and, a control mechanism for controlling the rotational velocities and phases of the propulsion members. Each propulsion member essentially resembles a mutilated circular wheel where the mutilated portion of perimeter segment is used to engage or 'pushes off' of the underlying surface. However, the propulsion members require a complicated control mechanism to collectively cooperate so as to operate effectively over various terrains. Also, the use of a circular perimeter segment for the propulsion members creates the same disadvantages aforementioned for wheeled vehicles.

Reid, in U.S. Pat. No. 4,102,423 shows a ground traction device which is non-circular in its periphery and each member containing a three lobed tire, preferably constructed of rubber. The periphery containing three individual arcs arranged in the form of an equilateral triangle. Members may be situated adjacent or axially spaced apart and have peripheries of any other suitable shape, such as two or four sided. It is intended to operate and tramp over soft ground and when transitioning to a hard surface, the ground engaging member behaves as a circular wheel of constant radius by compressing the rubber tire portion. However, this adaptation could create excessive amount of heat buildup in the rubber tire due to constant compression and rebound cycle when operated on a hard surface. The rubber or other flexible material under these conditions would eventually fail and de-vulcanize or delaminate, thus rendering a vehicle equipped with ground traction devices inoperative. Also, pressure sensitive soft terrain would be adversely affected by the penetrating 'digging' lobes when not compressed by the underlying surface.

Sfredda, in U.S. Pat. No. 2,786,540 illustrates a non-circular wheeled vehicle with similar phasing of the ground contacting wheels as with Harvey's patent where a set is "out of phase". This relationship contributes to good traction, so as to permit differently shaped edge portions of different wheels to simultaneously contact the ground at all times. This achieved by vertically reciprocating the axis of rotation within a slot so as to limit its travel, and to permit smooth contact with a horizontal plane. Other, non-circular, multi-sided configurations (polygons) as a hexagon, octagon or the like may be employed. Sfredda teaches the use of a roller and a cam disk to urge or float the axle within a limiting slot as it rotates by a driven geared pinion. However, two or three sided (lobed) configurations seem excluded due to gear interference or impracticality with a cam system. Also, the device contemplated is limited to a pair of non-circular wheels per wheel site. This would also cause 'digging' within pressure sensitive terrain since each corner edge portion would contact the surface simultaneously.

OBJECTS AND ADVANTAGES

It is a primary object of the present invention is to provide an improved amphibious surface vehicle which is adapted to effectively traverse various terrain types and fluidic substances.

Another object of the present invention is to provide a vehicle which can be easily adjusted for a range of surfaces; tractive mode across land and/or propulsive mode on fluidic surfaces.

Another object of the present invention is to provide a vehicle which is adapted with built-in gear reduction in its engagement devices.

Another object of the present invention is to provide a vehicle which minimizes impact to the underlying terrain or pressure sensitive substances.

According to the invention, the object is accomplished by providing a plurality of engagement devices mounted on a vehicle, which overcomes the above-mentioned disadvantages of the heretofore-known devices and methods of this general type and which is generally improved in its operation and efficiency.

SUMMARY

This invention relates to amphibious surface vehicles, particularly to the engagement or propulsion drive devices to be operated over varying load bearing (shear strength) surfaces, terrain attribute, traction conditions, and/or to impel thrust within low shear strength soils or highly fluidic substances. The invention disclosed herein amphibious surface vehicle with synchro-phased rotary engagement devices is applicable to a plurality of vehicles or structures desiring greater mobility and maneuverability to a variety of surfaces.

With the foregoing and other objects in view there is provided, in accordance with the invention, synchro-phased rotary engagement devices, the invention will now be described by way of example only and with reference to the accompanying drawings.

DRAWINGS

Figures

Figure 5A:
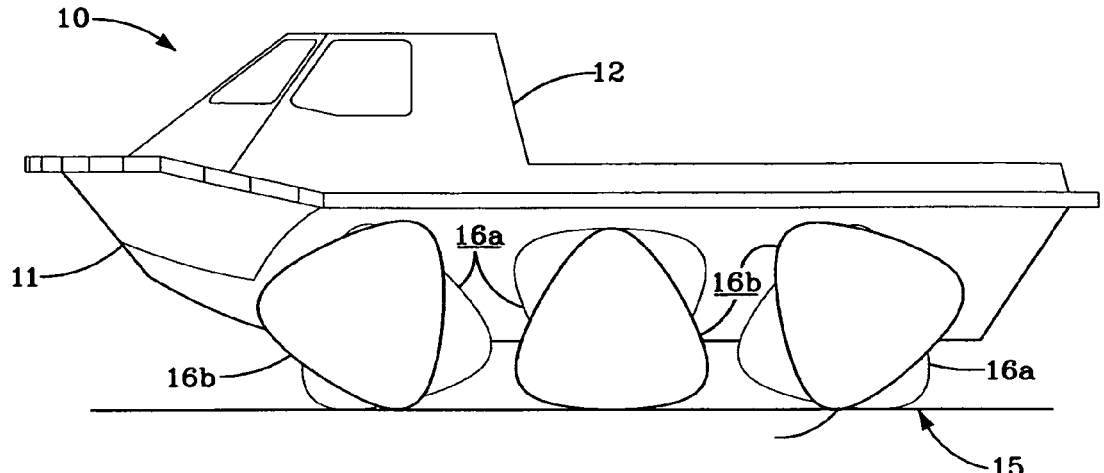
Figure 5B:
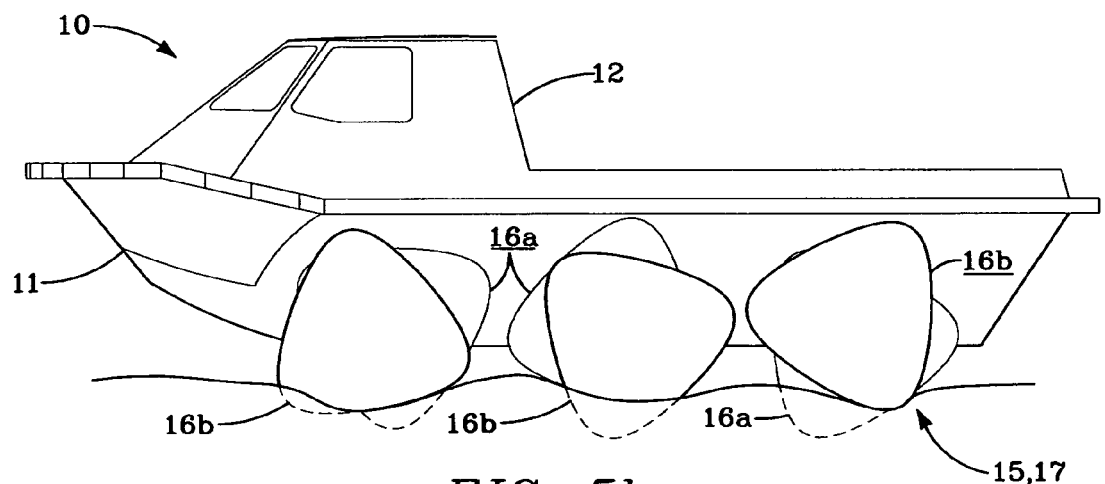
Figure 5C:
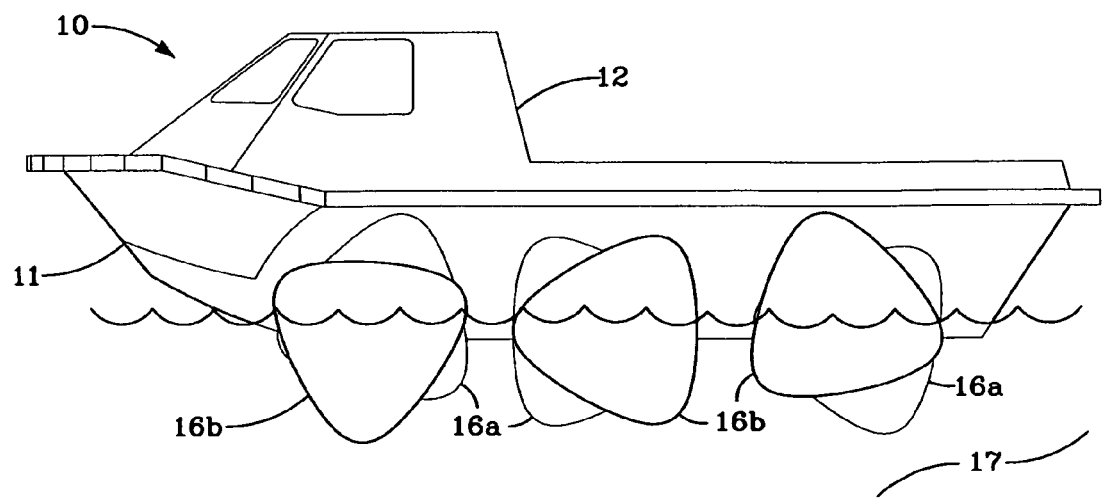
Figure 6:
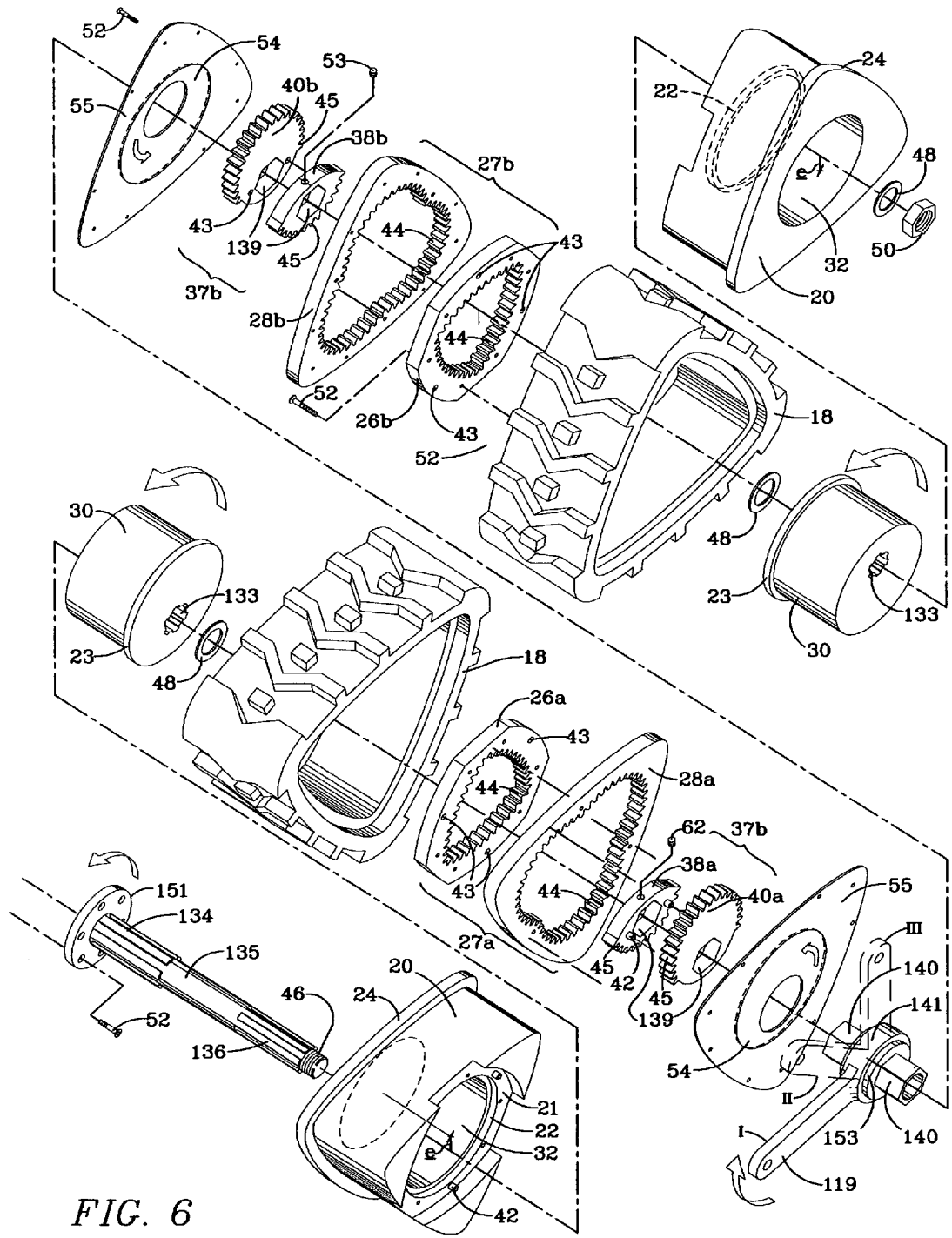

FIG. 5*a* is side elevation of one preferred embodiment engaging a planar surface;

FIG. 5*b* is side elevation of one preferred embodiment engaging a partially yielding surface;

FIG. 5*c* is side elevation of one preferred embodiment propelling forward within a fluidic substance; and FIG. 6 is an exploded perspective view of an alternate embodiment.

DETAILED DESCRIPTION

FIGS. 1-5

Preferred Embodiment

Figure 1:
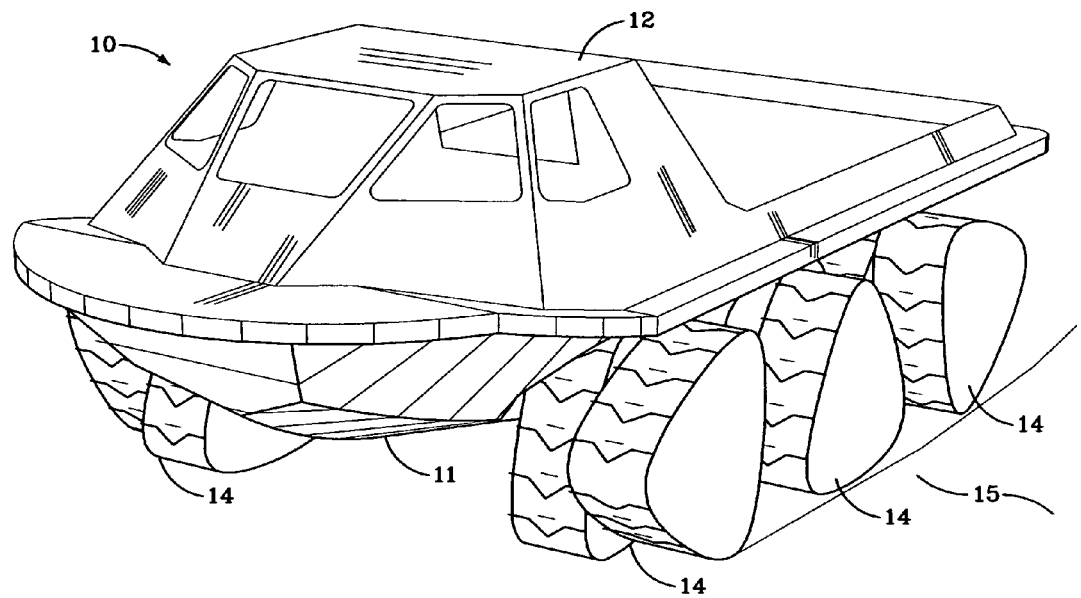
FIG. 1 is a perspective view of one preferred embodiment of the present invention.

Referring now to the drawings, in which like alpha-numeric characters of reference denote like elements, and particularly to FIG. 1 which illustrates a perspective view of one preferred embodiment of the instant invention. A self-propelled amphibious surface vehicle 10 which generally includes, a navicular-shaped hull or chassis assembly 11, a passenger cabin 12, a plurality of synchro-phased rotary engagement or propulsion devices 14, each mated distally and operatively to an axle housing 13 positioned near the waterline of each longitudinal side, thereon.

As shown in FIG. 1, there are preferably three engagement devices 14 located on one longitudinal side of chassis assembly 11 with an equal number coaxially disposed on the opposite side (partially shown) supporting and propelling vehicle 10 on a weight bearing surface 15. Although, substantially secured coaxially, engagement devices 14 of the preferred embodiment, may be operatively independent with a suitable mechanism known in prior art such as a differential (not shown) to decouple the coaxially paired propulsion devices 14 so as to permit independent rotation and phasing.

Figure 2:
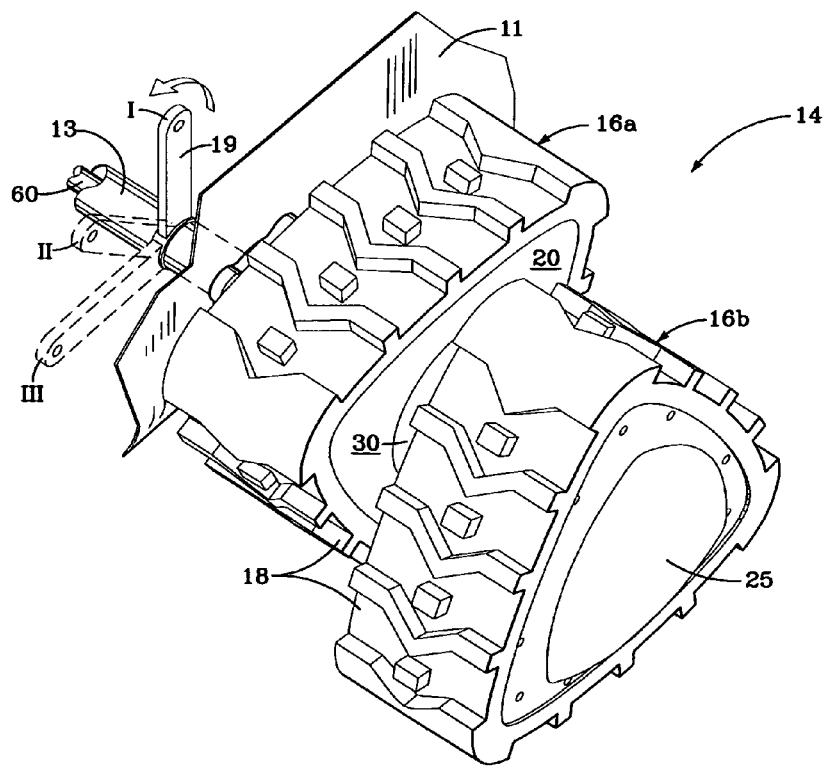
FIG. 2 is an enlarged perspective view, partially cut-away, of a portion the embodiment shown in FIG. 1 of the present invention.

In FIG. 2 which depicts a close-up perspective view of engagement device 14 mounted distally to axle housing 13. The engagement device 14 generally includes two rotor assemblies 16*a*, 16*b* each preferably clad by a treaded tire 18 mounted on a wheel 20 supported rotatably and secured to an eccentrically driven hub 30. Drive hub 30 is operatively connected to a drive axle 60 (partially shown) situated within axle housing 13. To position axle housing 13 angularly by use of an actuable lever 19 secured thereon and shown in solid in the I position (high contact mode). Preferably, actuable lever 19 is housed within chassis assembly 11 to limit the amount of hull penetrations and for protection from external impacts and to limit environmental exposure.

Referring again to FIG. 1, hull chassis assembly 11, which preferably encloses below deck, typical onboard components necessary for automotive transport such as a; motive force, power train, fuel storage, skid-steer/braking device (not shown). The superstructure, a passenger cabin 12 situated near the bow/front of chassis assembly 11 which houses driver controls, monitoring gauges, and occupant seating (not shown) typically needed to be effectively driven and operated. Also, another feature of the forward located passenger cabin 12 which has a facetted shape helpful to deflecting water spray and waves from entering the rear deck area of chassis assembly 11. This is especially applicable when transitioning from land to waterborne operations where high approach angles may be presented. If desired, the incorporation of self-bailing devices to the deck area such as scuppers (not shown) to passively evacuate water may be used when afloat.

If desired, other suitable techniques known in prior art to prevent, displace, remove, and/or seal from water intrusion, to safeguard buoyancy, may be utilized so as not to hinder the effectiveness of amphibious surface vehicle 10. Also, other steering systems may be incorporated as found on conventionally equipped automotive vehicles. The specific configuration and construction of the chassis assembly 11 and passenger cabin 12 are not important to the present invention and will not be described in any further detail within this specification.

However, one particular feature of the chassis assembly 11 is to provide housing and structural support for an actuable control device (not shown) to position lever 19 for each propulsion devices 14 which will be described later in the following paragraphs.

Figure 3:
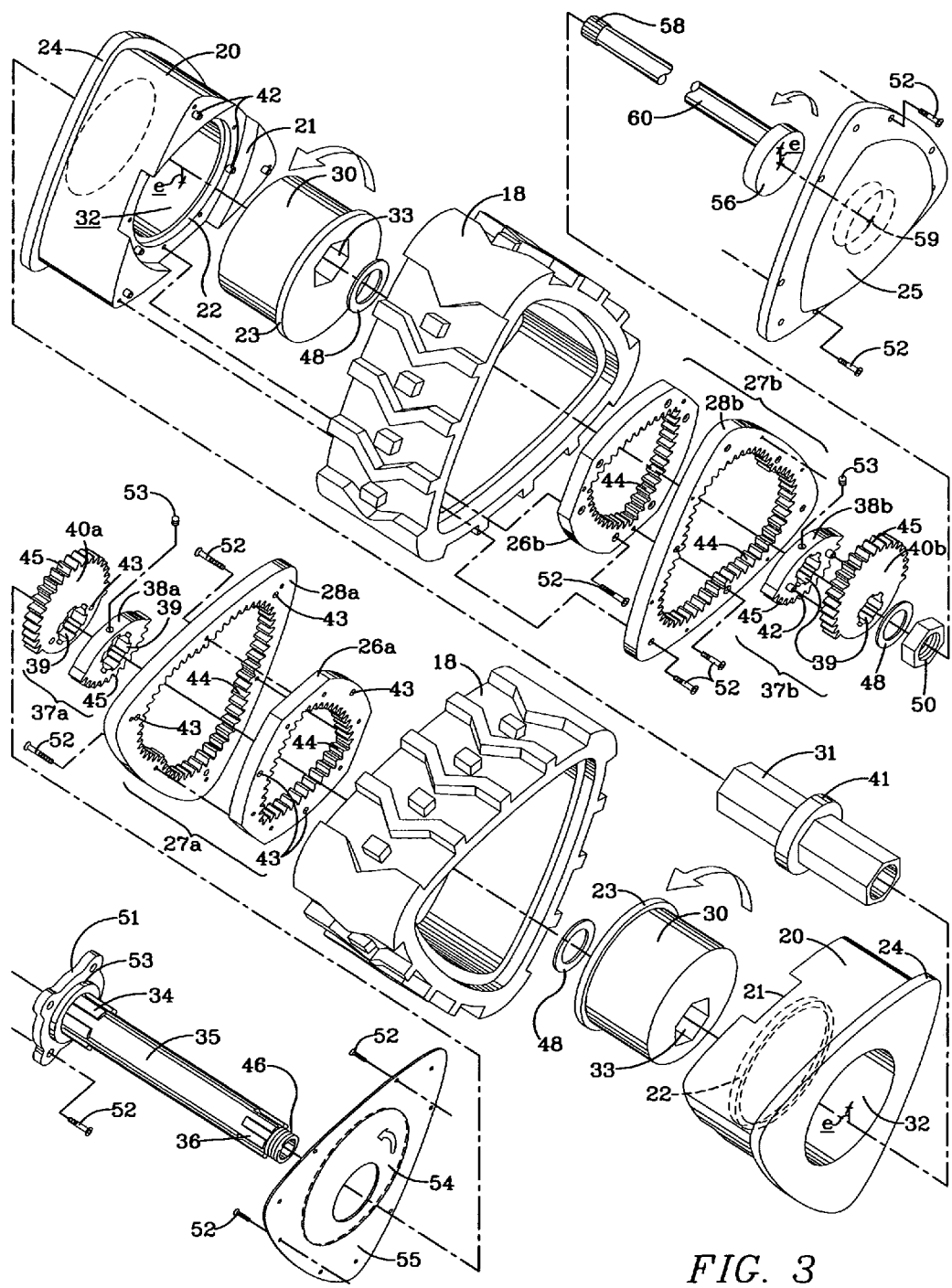
FIG. 3 is an exploded perspective view of the embodiment shown in FIG. 2 of the present invention.
Figure 4:
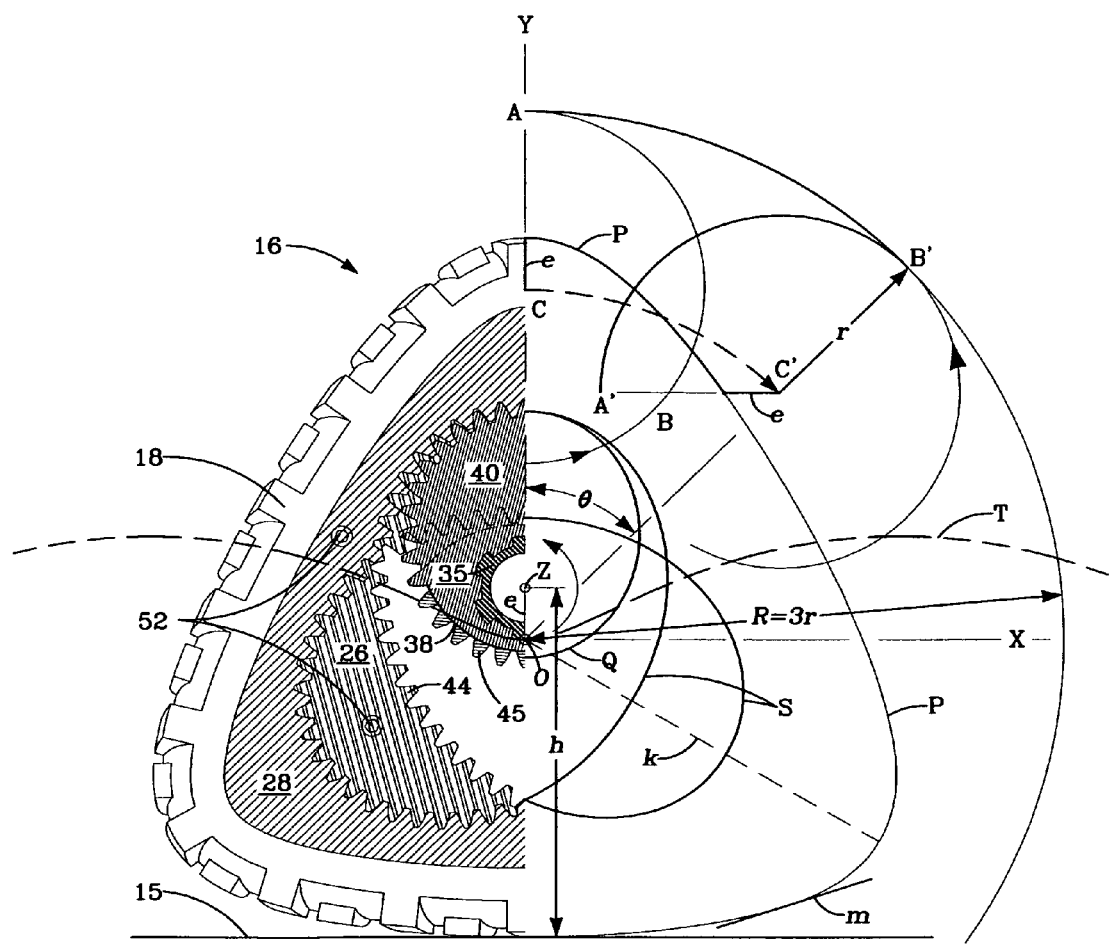
FIG. 4 is a side elevation view of which the right being schematic and the left illustrating a detailed view of the preferred embodiment of the present invention.

The details of each similar engagement device 14 of FIGS. 1, 2 are shown in FIGS. 3 and 4. Each engagement device 14 generally includes a pair of coaxially adjacent and in slightly spaced relation, an inner and outer lobed rotor assemblies, 16a and 16b respectively. Both 16a, and 16b are arranged 180° out of phase and revolve about a single axis Z, radially offset by a distance e, to urge cycloidal motion. In the art, the distance e is referred to as the eccentricity of the rotor, or alternately stated, the distance of the geometric center of a revolving body from an axis of rotation.

Although dissimilar in spatial relation, the identically structured rotor assemblies 16a and 16b, will be described as one for brevity in the following paragraphs.

Referring to FIGS. 3 and 4, particularly to an exploded isometric view of one engagement device 14, each rotor assembly 16a, 16b is comprised of resilient tire 18 mounted and fixed to a substantially tri-lobular shaped wheel 20a, 20b in a conventional manner. Tire 18, preferably with a wide aggressive tread and constructed of solid molded rubber, partially overlaps a flange like rim 24 along the peripheral edge an integral of each wheel 20a, 20b. Also, generally included on one side of each wheel 20a, 20b a castellated recess 21, a shoulder 22 within, and a multiplicity of threaded apertures for fasteners are disposed opposite rim 24.

The preferred embodiment comprises solid rubber tire 18 of suitable hardness, and the remainder of engagement device 14 generally consists essentially of low carbon steel, preferably alloyed to resist corrosion in marine environments and to minimize material by providing high-strength to weight properties. The tire may be constructed if desired in other known structural forms such as pneumatic, foam, or airless similar to Michelin's "T-wheel" to minimize weight and material. To provide the hollow structure of wheel 20a, 20b which can comprise of several fitments joined together by conventional fasteners with associated gaskets, it is preferably fusion welded to provide a sealed durable unit thus creating additional needed buoyancy.

Referring again to FIG. 3, disposed oppositely of rim 24 of each wheel 20a, 20b a bifurcated, non-circular, internal gear assembly 27a, 27b is attached and revolves therewith. The gear assembly 27a, 27b is mechanically fixed with a plurality of locating dowel pins 42 and flush head bolts 52 to their appropriate apertures within castellated recess 21 of wheel 20a, 20b. The interior half of internal gear assembly 27a, 27b is keyed within recess 21, and comprises a, tri-cusped shape, internal gear segment 26a, 26b and now completing the exterior half, a tri-lobed shape, internal gear segment 28a, 28b with a periphery substantially the same as rim 24.

DETAILED DESCRIPTION

FIGS. 1-5

Preferred Embodiment

Collectively, internal gear segment halves 26a and 28a complete a closed pitch curve but laterally offset to overcome mechanical interference with a bifurcated, non-circular, pinion gear assembly 37a, 37b. If desired an integral unit may be utilized by combining each gear half into one thus reducing additional components and manufacturing costs, but for clarity the bifurcated assemblies are shown in the FIGS. 3, 5, and 6. The internal gear assemblies 27a, 27b, which rolls without slipping and conjugates with a stationary pinion assemblies 37a, 37b, thus urging rotational phasing of rotor assembly 16a, 16b, as it revolves about axis Z. The particular design criteria of the non-circular pitch curves S and Q, with a plurality of teeth formed thereon 44, 45, respectfully will be discussed in more detail later in this specification.

In addition to controlling the phase of rotor assembly 16a, 16b, each internal gear segments 26a, 26b may be utilized to laterally retain cylindrical hub 30a, 30b within a bore 32, which is geometrically centered about axis O of FIG. 4 to wheel 20a, 20b. Also, internal gear segment 28a, 28a may be used as the compliment to rim 24 in laterally securing tire 18 to the peripheral surface of wheel 20a, 20b.

Referring again to FIG. 3, to hub 30a, 30b with a diameter substantially equal to its depth, includes a concentric retaining ring 23 on one extremity to be disposed within shoulder 22 of wheel 20a, 20b. Also included, a hexed or splined aperture 33, eccentrically located within to receive one half of a similarly shaped coupling collar 31, an anti-friction means (not shown) supported thereon. Preferably, appropriate contact seals may accompany the roller element bearing(s), disposed between the hub 30a and the interior surface of cylindrical bore 32, to prohibit the incursion of water and foreign contaminates.

As shown in FIGS. 2 and 3, isometric views of one engagement device 14 situated between two adjacent similar devices and operatively connected to chassis assembly 11 of FIG. 1 via axle housing 13. Aforementioned, each propulsion device 14, generally comprises a pair of rotor assemblies 16a and 16b. Each rotor assembly 16 describe in detail are now joined via the coupling collar 31 and slightly separated axially by a spacer 41, preferably integral thereto.

The coupling collar 31 depicted allows differing radial configurations of the hubs 30a and 30b inherent to the symmetrical geometrical shape of a polygon. It is preferred with a pair of rotor assemblies 16a and 16b, to maintain a near mass-balance, to be spatially situated in the 180° opposing configuration. An additional rotor, so as three rotors utilized would benefit by having the spacing in the 120° configuration. Additionally, other prior art techniques to counter-balance the engagement device 14 may be utilized to mitigate vibration and wobbling effects especially at high rotational velocities.

Also, if desired, the coupling collar 31 may be fitted with at least one anti-friction means (not shown), either sleeve or roller element bearing within. The coupling collar 31 is rotationally mounted and concentric with rotational axis Z on a journal portion of a flanged tubular spindle 35.

The flanged tubular spindle 35, substantially cylindrical in shape, generally includes a pair of splined or keyed portions adjacent to the journal portion and a distal portion with threads 46 formed thereon. The hollow portion preferably comprises a sleeve bearing(s) (not shown) within to rotatably support the rotational driven means. The phasing pinion gear assemblies 27a and 27b are adapted and secured vertically (traction mode I) in the rotational plane to inner and outer splined portions 34 and 36, respectively.

Referring again to FIG. 3, it best can be seen the details of pinion assemblies 27a and 27b. The interior (relative to rotor assembly) half of pinion gear assemblies 27a and 27b comprises an, eye shaped, lower external sector gear 38a, 38b to conjugate with cusped internal gear segment 26a, 26b. Now completing the exterior half of pinion gear assemblies 37a and 37b, comprises a partially mutilated external gear 40a, 40b so as not to interfere while conjugating with lobed internal gear segment 28a, 28b. The halves are preferably mechanically fastened with a pair of dowel pins 42, in face to face relation, to provide additional torsional support when mounted to there respective splined portions on spindle 35.

The pair of pinion gear assemblies 37a and 37b each comprises splined apertures within to coincide with there respective mounting splines which exhibit slightly different inside spatial parameters. This is to allow pass through to mounting splines 34 for gear assembly 37a and refusal of gear assembly 37b, thus retaining it to mounting splines 36 on spindle 35. Preferably, securing means such as a set screw(s) 53 or other appropriate fastener(s) within threaded aperture(s) to allow lateral adjustments in position of pinion gear assemblies 37a and 37b.

Also, to maintain the correct coplanar relationship with corresponding mating gears a shim or spacing washer(s) 48 inserted between the rotating assembly and pinion faces may be employed. A retaining hex nut 50 with associated lock washer 48 fastened to distal threads 46 supporting pinion gear assembly 27b to spindle 35, thus laterally securing coupling collar 31 and rotor assemblies 16a and 16b mounted thereon.

In designing and constructing the gear assemblies 27a, 27b and 37a, 37b conjugating pitch curves and the exterior profile shape of rotor assemblies 16a, 16b of the preferred embodiment described above. First, the gears pitch curves are an imaginary line that allows for positioning of the teeth, second the two meshing gears pitch curves contact at a line of tangency to operate effectively. It can best be seen within the schematic portion of FIG. 4 depicting the non-circular pitch curves Q, S and rotor profile P which will be parametrically derived.

For clarity, a hypotrochoid plane curve generating method may be used to determine the rectangular coordinates used for the creation of a three lobed peripheral contacting curve P. A hypotrochoidal curve is formed by first selecting a fixed circle and a generating circle having a radius less than the fixed circle. The generating circle is placed within the fixed circle so that the generating circle is able to roll along the circumference without slipping. The hypotrochoidal curve is defined by the locus of points traced (a generatrix) by the distal portion of a curtate line segment radial fixed to the center of the generating circle, as the generating circle is rolled within the circumference of the fixed circle.

The parametric equations to calculate the pair of rectangular coordinate points for the profile curve P are provided by the following:

$$X_P = (R-r)\sin(\theta) - e\sin\left(\frac{(R-r)\theta}{r}\right)$$

$$Y_P = (R-r)\cos(\theta) + e\cos\left(\frac{(R-r)\theta}{r}\right)$$

Wherein:
R = is the fixed (outer) circle radius
r = is the generating (inner) circle radius
θ = is the angle to the center of generating circle
e = eccentric and/or length of radial line segment The equation above is one of many that can be utilized by those skilled in the art for determining appropriate non-circular curve coordinates. Any mathematical function that does not reverse its slope, have discontinuities, excessive ratios or cause mechanical interference may be used. Also, the level of accuracy and acceptable tolerances may justify which method one is likely to employee in the design and construction process.

In designing the synchro-phased rotary engagement devices 14, in accordance to the preferred embodiment shown in FIGS. 1-5, firstly by determining an adequate ground clearance and also providing sufficient thrust when waterborne. A height h of 34 inches perpendicularly measured between a horizontal surface 15 to a rotational axis Z was obtained experimentally. Now to select the appropriate curvature of the profile curve P while providing ample propulsion (lobes) without sacrificing radial contact area so as not to be to abrupt or concave. This is found to be generally 30 percent in variation of the rotor radii, thus 10 inches of range, therefore 39 inches at the lobe apices and 29 inches at mid transition, respectfully. If desired, other percentages of variation may be selected to increase or decrease the degree of lobe curvature of the rotor assemblies 16a and 16b although this will slightly alter the constant velocity output function to a plane surface 15.

Now with the above criteria, other design parameters can be mathematically derived such as e which equates to 5 inches or one half the throw of eccentric hub 30 which equals the difference in the rotor periphery radii. This is also the length of the curtate line segment to generate the three lobes and three transitions on the contact profile curve to maintain a constant h to axis Z. Now to determine the remaining parameters R and r, which share a 3:1 geometric relationship a numerical integer to be a closed algebraic curve with three lobes. Hence, R=r3 and from FIG. 4 we see that h=R−r and substituting r with R/3, combining and arranging like terms, derives a formula R=3h/2. Consequently, solving with a value of 34 inches for h, the fixed circle radius R equates to 51 inches and by the 3:1 relationship aforementioned, thus obtaining the generating circle radius r of 17 inches.

Returning to the parametric equations provided above, and inputting the design values for curve P along with a range of angular intervals for θ from 0° to 360° into each simultaneously, thus resulting in a multiplicity coordinate pairs which create the generatrix. If desired to reduce the number of calculated point pairs used, they may be plotted or placed in a computer aided drafting (CAD) program and preferably interconnected by arc or line segments to interpolate and fill between the generated point coordinates. Also, utilizing another technique available within a CAD program containing a mirroring sub-routine, this can replicate the graphical inverse of a selected segment of the profile curve P, to efficiently complete the remaining curve segments.

The parametric equations provided above produce coordinates beginning from the positive Y-axis and progressing in a clockwise direction starting from 0° and ending at 360°. This modification helps allows mirroring about the Y-axis if generated to 180° or one half the range of a complete circle. Again, the number of points calculated depends on the level of accuracy desired and for the preferred embodiment is one quarter of a degree resulting in 1,440 points connected by arc segments were used in its creation. In the schematic portion of FIG. 4, the fixed and generating circles with the curtate line segment can be seen as it proceeds clockwise from C-C' as it rolls A-A' and B-B' thus creating the generatrix of contact curve P as it rolls within the fixed circle.

Before moving on to non-circular curves Q and S, a brief explanation to the rationale of each three lobed rotor assemblies 16a,16b and their unique feature in providing continuous contact without varying h while rolling T and transmitting a near constant velocity tangentially as it revolves upon surface 15. Conventional circular internal gear arrangement that provides phasing found on rotary trochoid displacement devices (Wankel type) may be used, if desired, but the input rotation velocity would need to be varied to maintain both a simultaneous contact and constant tangential velocity. This would be problematic if more than one rotor assembly 16 were desired for engagement device 14 due to spatial limitations of providing a varying rotational input for each separate rotor assembly 16. Although, the use of this adaptation may be devised as to function but with increasing difficulty with each additional rotor assembly 16 desired for engagement device 14. Therefore, by converting constant angular velocity to variable angular velocity via a non-circular internal gear system taught herein is far superior in providing positional phasing to a plurality of rotor assemblies 16a and 16b or more if desired from a single rotational input source while transmitting a near constant tangential velocity output to a plane surface 15. It will be apparent that the present invention will greatly reduce the mechanical complexity of such devices and permits its adaptation to conventional vehicles and implements with no farther modifications.

Now that the formation of three lobed contact curve P is complete, the phasing gear pitch curves Q and S, external (pinion) and internal respectfully, may now be mathematically obtained utilizing the coordinate point data from contact curve P. Aforementioned, for brevity and familiarity, the hypotrochoid non-circular curves which are known to those skilled in the art have also derived other mathematical formulas such as the tangential vector angle to any point located on the hypotrochoid when the angle θ to the generating circle is known. The tangential vector angle ϕ will be used to compute both internal and pinion phasing gear parameters in polar coordinate form which are as follows.

$$\phi = \theta\left(1 - \frac{R}{2r}\right) + \cot^{-1}\left[\frac{r-e}{r+e}\cot\left(\frac{R\theta}{2r}\right)\right]$$

$$\beta = \tan^{-1}\left(\frac{y}{x}\right) - \phi$$

Wherein:
ϕ=tangential vector angle (slope m)
β=angle at contact with horizontal surface $$\theta_Q = \cos^{-1}\left(\frac{h - \sqrt{x^2+y^2}\cos(\beta)}{e}\right) \quad R_Q = \frac{\sqrt{x^2+y^2}\sin(\beta)}{\sin(\theta_Q)} - e$$

$$\theta_S = \theta_Q - \phi \quad R_S = R_Q + e$$

To convert from polar form to rectangular coordinate form to plot curve Q and S:

$$X_Q = R_Q \sin(\theta_Q), \quad Y_Q = R_Q \cos(\theta_Q) + e$$

$$X_S = R_S \sin(\theta_S), \quad Y_S = R_S \cos(\theta_S)$$

If desired, the hypotrochoid or other non-circular profile curves used for the rotor assembly 16 periphery may utilize another method to approximate the tangent slope m. For example, by finding the mathematical difference between each of the $Y_P$ and $X_P$ values immediately adjacent to the coordinate point in question. Then by dividing the ΔY by ΔX thus obtaining the tangent slope m which can now be inputted into curve Q and S equations after converting to angle ϕ.

As with periphery curve P, the two curves Q and S can be completed using the same technique by joining the arc or line segments and mirroring about the Y-axis in a CAD program. Although, the mirroring of pitch curve P requires an additional axis k located 120° positive of the Y-axis to correctly reflect the curve for a three lobed contact curve. Also, an additional step to extrapolate the 0° and 120° portion may done by extending the adjacent arc to the Y and k axis again by using CAD extend line or arc sub-routine.

DETAILED DESCRIPTION

FIGS. 1-5

Preferred Embodiment

In designing and constructing other multi-lobed engagement devices 14, with four lobes for example, the mirroring axis k would be located at 135° to correctly generate the internal gear pitch curve. This relationship can best be seen in FIG. 4 where if pitch curve S is conjugated upon pitch curve Q showing 120° and 180° of total arc respectfully, resulting in the rotational displacement of 60° for the contact curve P of rotor assemblies 16a and 16b. A two-lobed rotor would require a mirroring axis k at 90° and result in the rotational displacement of 90° for the contact curve P.

It should be noted, the use of a hypotrochoid contact curve other than three lobes, renders a tangential velocity that is significantly variable with a constant rotational input, thus requires an alternative design method to remedy, if desired. This technique is as follows.

To determine fixed pinion curve Q without complete coordinate parameters for the rotor peripheral curve P except for the max/min radii desired and the number of lobes to be spaced equal-distant are known or selected. The following method may be utilized to generate the pitch and contact curves and is disclosed herein.

First, multiply the geometric mean of the rotor radii maximum and minimum values by the desired lobe module. For example, four lobes would require 90 degrees or revolution to complete a cycle, thus 270 degrees of conjugation per 360 degrees of input rotation. The module then would be 0.75 to output the required 90 degrees to complete a cycle.

This product is found to be equal to the perpendicular distance from the near foci to the directrix of a conical curve or ellipse with the major axis being situated vertically.

Several geometric properties of the ellipse are exploited to provide the unique kinematic relationships such as the constant ratio between the radial distance from the focus and the normal distance between that point on the curve to the directrix, and to those skilled in the art, the eccentricity E of the ellipse.

Secondly, eccentricity E can be derived of the ellipse curve or pitch curve Q, by dividing the difference of the arithmetic mean of the rotor radii or h and the directrix value above by the throw of the eccentric e and inversing the resultant.

Thirdly, the product of the eccentricity E and the directrix value defines the semi-latus rectum of the ellipse and the semi-major axis can now be found by dividing the semi-latus rectum by one minus the square of eccentricity E.

Finally, the distance to the near foci axis can be found by multiplying eccentricity E by the semi-major axis which now defines the ellipse that will become the pitch curve Q of the pinion phasing gear with axis Z located at its near focus.

To develop the conjugate or internal pitch curve S to mate with the pinion curve Q, the Law of Cosines preferably may be used to yield a locus of points when connected by lines or arcs have a length equal to the ellipse perimeter. The radial distances are greater by the distance of the throw or e and for a four-lobed rotor which results in 270 degrees of cumulative arc. To connect and complete the curve S use techniques mentioned above.

Now with both conjugating curves Q and S defined, the contact curve P can now be generated. Begin by dividing the radial distances of each point on curve S by E to find the normal distance when in contact with a horizontal surface 15. Then by placing the constant ratio pairings at the center of rotor 16 O and to the curve S while maintaining there angular and length relationships, thus generating a locus points that create curve P.

Now to the placement of gear teeth 44, 45 on both internal and external pitch curve segments, which may be done prior to the mirroring procedure. The involute generation of the gear tooth profiles utilized 20 degree pressure angle with a 0.23 inch positive profile shift to alleviate interference. For the preferred embodiment, a virtual cutter rack laid out for segment length and iterated in a CAD program to produce highly accurate teeth which may use a computer numerically controlled milling machine for construction.

Although, gears of this type may be produced for instance with a reciprocating cutter of fellows type, whose pitch circle is made to roll slowly on the curved pitch line of a non-circular gear. Alternate methods to produce the gear profiles of various types may be utilized and to those skilled in the art, to numerous for description in this specification.

The preferred embodiment as shown in FIGS. 3 and 4 contains 32 teeth for each of the external pinion gear assemblies 37a and 37b and 96 teeth for each of internal gear assemblies 27a and 27b. It has been found that with, at a minimum, a difference of 15 teeth reduces interference while conjugating in the high contact ratio lobe portions. When the gears are bifurcated, as with the three lobe rotor, the internal gear teeth located at 60°, 180°, and 300° as shown in FIG. 3 are trimmed so as not to interfere and bind during operation. This is one method utilized in design process and constructing the various non-circular curves utilized in preferred embodiment with three lobes.

Now returning to FIG. 3 where it can best be seen the proximal portion of spindle 35 which comprises a symmetrically shaped mounting flange 51 with, at least one, preferably four apertures equally spaced and adapted to accept flush head bolts 52. Also, a shoulder 53 concentrically formed thereon to provide a supporting journal for a two piece mechanical cover, 54 and 55, which are substantially congruent to flange 23 and rim 24 in profile, respectfully.

The cover member 54 eccentrically disposed on the shoulder 53 also rotates within cover member 55 which is fastened to and revolves with inner rotor assembly 16a, 16b. Preferably, thin section bearing(s) and appropriate contact seal(s) mention above and accompanying wheel 20 and hub 30 bearing(s) may be used between the rotating members of the cover members 54, and 55.

Alternatively, to house the exposed internal gear assembly 27b and pinion gear assembly 37b an outwardly convex drive plate 57, is secured with a plurality bolts 52, covers and revolves with rotor assembly 16b. Preferably, drive plate 57 has a periphery and central thickness similar to internal gear 28b to adequately support a bearing cup 59 (dotted lines) which is geometrically centered within. This is to urge revolving motion to rotor assemblies 16a via coupler 31 and 16b (direction arrows) a circular journal 56 is eccentrically supported distally on a drive axle 60 integral thereto. Preferably, a roller element bearing (not shown) mounted between eccentric journal 56 and bearing cup 57 to efficiently transmit torque. Now to axle 60 with a proximal splined portion 58 formed thereon, pass through the hollow portion of spindle 35 and operatively connected to the motive force rotational means (not shown) within chassis assembly 11.

In the preferred embodiment, in FIGS. 1-5, supporting spindle 35 is similar to prior art in the operational sense, such as with floating drive axle means found on extreme duty off-road vehicles. One inherent advantage for example is easy access to components to inspect, repair, and or replace without the complete disassembly of engagement device 14. Also, for instance, disconnecting the motive means such as the removal of drive axle 60, would not render engagement device 14 inoperable as a support idler, therefore still functional to amphibious surface vehicle 10 in a load carrying role. This built-in redundancy is particularly critical in harsh remote environments where mechanical failure may occur while still allowing amphibious surface vehicle 10 to be effectively operated by the other fully functioning engagement devices 14.

In operation of the particularly configured and constructed amphibious surface vehicle 10 as described herein, which provides mobility, agility, and versatility over a wide variety of terrain an aquatic realms. Traversing with the present invention retains the benefits of a circular wheel for operation over hard or improved surfaces and exhibits much improved tractive and pressure properties when operating over yielding and deforming substrates, thus increasing its efficiency. The engagement devices 14 of the present invention overcomes this problem since, as it does not rely on a tread pattern to produce tractive effort, the surfaces can be relatively smooth and flat, thus can provide a paddle like action. This, together with a relatively good operating speed, also minimizes degradation of the ground surface that is a common problem with conventional wheeled devices.

It can best be seen in FIG. 5a, a side view depicting one novel feature of the present invention, amphibious surface vehicle 10 supported by a plurality of synchro-phased rotary engagement devices 14 which comprise of a pair of rotor assemblies 16a, 16b each. The preferred embodiment is operating in an overlapping contact ratio mode (position I) engaging simultaneous and continuously with a non-yielding planar surface 15.

Now to FIG. 5b, another side view depicting a second novel feature of the present invention amphibious surface vehicle 10 propelled by a plurality of synchro-phased rotary engagement devices 14 which comprise of a pair of rotor assemblies 16a, 16b each. The preferred embodiment is shown operating in the traction/propulsion mode (position II), providing traction, floatation, and imparting forward thrust to a pliable yielding surface found between hard surface 15 and substance 17 exhibiting high fluidity.

Turning to FIG. 5c, yet another side view depicting a third novel feature of the present invention amphibious surface vehicle 10 propelled by a plurality of synchro-phased rotary engagement devices 14 which comprise of a pair of rotor assemblies 16a, 16b each. The preferred embodiment is shown operating in the waterborne propulsion mode (position III), imparting forward thrust within substance 17 exhibiting high fluidity.

DETAILED DESCRIPTION

FIG. 6

Alternate Embodiment

The details of an alternative form of engagement device 14 are illustrated in FIG. 6 an exploded isometric view. Essentially the same in operation, a engagement device 114 comprises of rotor assemblies 16a, 16b as described above, except the phasing gear assemblies 27, 37 are situated in face to face relation instead of outwardly as with engagement device 14. This spatial relationship requires an actuating lever 119 to be operatively connected between rotor assemblies 16a, 16b. This alternative is due to the omission of the driven means such as axle 60 in lieu of a solid live spindle 135 to provide both support and to urge rotation (direction arrow) to eccentric hubs 130a and 130b. Also, engagement device 114 requires an additional mechanical cover member 54, 55 without the need of drive plate 25 for its operation.

The actuating lever 119 preferably integral to a hexed mounting collar 140 which supports both pinion assemblies 37a, 37b in a vertically secured position (high contact mode shown solid) to phase rotor assemblies 16a,16b. The hexed mounting collar 140 may be integral and spaced axially by a central member 141. Both mounting collar 140 and central member 141 with a bore 142 which allow pass though of spindle 130, may also contains two support shoulders 153 for both mechanical covers. Seals and anti-friction means aforementioned for the preferred embodiment may be used if desired.

Alternate embodiment shown in FIG. 6 utilizes live spindle 135 to transmit torque to the rotor assemblies 16a, 16b instead of a fixed spindle means as shown in FIGS. 2 and 3. The cylindrical hubs 130a and 130b are similar to hubs 30a and 30b except for mounting apertures 133 which are shown splined. These hubs 30a, 30b are mated to there respective mounting splines 134, 136 to solid live spindle 135 and secured by washer 48 and retaining nut 50.

The live axle arrangement may be adapted for use on many vehicle drive systems such as an agricultural type tractor or an automotive type wheel hub. Varying the different propulsion modes is accomplished utilizing actuating lever 119 (arrow) which is shown situated between rotor assemblies 16a and 16b. The device to position lever 119 may be actuated from the 3-way hitch system typically found on the tractor mentioned above. Also, if desired, the lever 119 could be fixed so as not change the traction mode from one to another when consistently operating within one type of terrain.

In its particular application to the movement of an amphibious surface vehicle as hereinbefore described, the present invention provides a further significant advantage over conventionally wheeled vehicles. The synchro-phased rotary engaging device 14 exhibits a profile that is less than one third that of a circular wheel, with a comparable operating diameter, therefore a significant reduction in mass while providing a greater torque transfer.

Alternatively, those skilled in the art will readily recognize that a wide variety of other support structures and various other design configurations may be used while still enjoying the benefits and advantages of the invention as taught herein. While the description above contains much specificity, these should not be construed as limitations on the scope of the invention, but as exemplifications of the presently preferred embodiments thereof. Many other ramifications and variations are possible within the teachings of the invention. For example, if desired, the rotor assemblies 16a, 16b may be axially separated further so as to be essential one rotor per device 14. The use of a fixed roller chain in the shape of the internal pitch curve S and sprocket(s) as a substitute to gearing for one or more of the fixed pinions having the periphery essentially the same as pitch curve Q. Without motive means or from human power means as with a wheel-chair like device for off-road use or steep inclines. This large overlapping contact area is especially useful where tipping may occur due the inherent stability of engagement device 14.

Thus the scope of the invention should be determined by the appended claims and their legal equivalents, and not by the examples given.

I claim:

1. An amphibious surface vehicle adapted for travel over a surface, comprising:
   a) a chassis assembly being generally rectangular and having a greater extent extending longitudinal;
   b) a plurality of engaging members, being coaxially disposed and rotatably coupled to said chassis, for propelling said chassis assembly across a surface, each of said plurality of engaging members having a substantially multi-lobular periphery, and further wherein each said plurality of engaging members having a plurality of offset rotor members being angularly opposed on each of said plurality of engaging members;
   d) and further wherein each of said plurality of offset rotor members are coaxially coupled to an eccentric hub that urges cycloidal motion;
   e) and further wherein where each of said plurality of offset rotor members are phased by a non-circular internal gear pair; and
   f) a control means, coupled to said plurality of said engaging members, for altering a phasing incidence to vary tractive effort.

2. An amphibious surface vehicle comprising:
   a) a chassis supported longitudinally by a plurality of rotary engagement devices, each said plurality of rotary engagement devices having a drive shaft, having a center, rotatably coupled to said chassis having a fixed axis;
   b) a hub, having a center, being positioned about said drive shaft and connected thereto, said center of said hub being offset from the center of said drive shaft for rotation about said fixed axis, by a distance e;
   c) a rotor pivotably disposed on said hub for revolving about said fixed axis as said drive shaft rotates; and
   d) a first gear connected to said rotor, and a second gear in operational contact with said first gear to control the rotational phase of said rotor; wherein:
   e) said rotor has a non-circular periphery defined by at least two lobes, wherein the height of said lobes are equal to twice said distance e of said hub,
   f) said first gear is an internal gear that is coaxial to said rotor, said first gear also having a non-circular pitch curve;

g) said second gear being an external gear and being fixedly attached to said fixed axis, wherein said second gear also having a non-circular pitch curve; and further wherein h) said first gear and said second gear having a gear ratio that is equal to the number of said lobes of said rotor; and i) further whereby said amphibious surface vehicle is propelled by said rotary engagement devices operating with a constant rolling radius upon a supporting surface.

3. The amphibious surface vehicle of claim 1 further including a navicular shaped hull for housing an engine, a drive train, and controls, and further wherein said navicular shaped hull is integral with said chassis, thereby allowing said vehicle to travel upon a fluidic surface.

4. The amphibious surface vehicle of claim 3 wherein said navicular shaped hull has a passenger cabin mounted thereon.

5. The amphibious surface vehicle of claim 2 further including a lever coupled between said second gear and said chassis for skewing said gear about said fixed axis, thereby adjusting a phase incidence of said rotor upon said surface.

6. The amphibious surface vehicle of claim 2 wherein said drive shaft has at least two hubs eccentrically connected and diametrically positioned thereon with said rotor pivotably disposed on each of said hubs.

7. The amphibious surface vehicle of claim 2, wherein said pitch curve of said external gear is in the shape of an ellipse having a first focus positioned at said fixed axis and a second focus above said first focus.

8. The amphibious surface vehicle of claim 2, wherein said periphery of said rotor is defined by at least three lobes.

9. The amphibious surface vehicle of claim 8, wherein said internal gear and said external gear are bifurcated.

10. The amphibious surface vehicle of claim 7 wherein periphery of said rotor has a shape of an ideal hypotrochoid having a fixed radius R about ten times said distance e and a generating radius r equal to one-third of said fixed radius R.

11. The amphibious surface vehicle of claim 2, wherein said periphery of said rotor is a rubber tire.

12. A vehicle supported by at least one rotary engagement devices comprising:

a) a drive shaft, having a center, rotatably coupled to said vehicle having a fixed axis;

b) a hub, having a center, being positioned about said drive shaft and connected thereto, said center of said hub being offset from the center of said drive shaft for rotation about said fixed axis, by a distance e;

c) a rotor pivotably disposed on said hub for revolving about said fixed axis as said drive shaft rotates;

d) a first gear connected to said rotor;

e) a second gear in operational engagement with said first gear to control a rotational phase of said rotor; wherein f) said rotor is comprised of a non-circular periphery defined by at least two lobes, and further wherein the height of each of said two lobes is equal to twice said distance e of said hub axis;

g) said first gear is an internal gear which is coaxial to said rotor, and further wherein said first gear has a non-circular pitch curve;

h) said second gear is an external gear that is fixed about said fixed axis, and further wherein said second gear has a non-circular pitch curve; and further wherein i) said first gear and said second gear have a gear ratio that is equal to the number of lobes of said rotor;

j) whereby said vehicle is propelled by said rotary engagement devices operating with a constant rolling radius upon a supporting surface.

13. The vehicle of claim 12, further including an lever coupled between said second gear and a chassis for skewing said gear about said fixed axis, thereby adjusting a phase incidence of said rotor upon said supporting surface.

14. The vehicle of claim 12, wherein said shaft has at least two hubs eccentrically connected and diametrically positioned thereon, said rotor being pivotably disposed on each of said hubs.

15. The vehicle of claim 12, wherein said second gear has a pitch curve in the shape of an ellipse having a first focus positioned at said fixed axis and a second focus above said first focus.

16. The vehicle of claim 12, wherein said periphery of said rotor is defined by at least three lobes.

17. The vehicle of claim 16 wherein said periphery of said rotor has a shape of an ideal hypotrochoid having a fixed radius R about ten times e and a generating radius r equal to one-third of said fixed radius R.

18. The vehicle of claim 16, wherein said first gear and said second gear are bifurcated.

19. A rotary engagement device comprising, in combination:

a) a shaft having a fixed axis;

b) a hub, having a center, being positioned about said drive shaft and being eccentrically connected to said drive shaft for rotation about said fixed axis, said hub and shaft having a rotational axis e extending from the center of the shaft to the center of the hub;

c) a rotor pivotably disposed on said hub for revolving about said fixed axis as said shaft rotates;

d) a first gear connected to said rotor;

e) a second gear in operational engagement with said first gear to control a rotational phase of said rotor;

f) wherein said rotor has a non-circular periphery defined by at least two lobes, and further wherein the height of said at least two lobes is substantially equal to twice said distance e of said hub;

g) wherein said first gear is an internal gear which is coaxial to said rotor, and further wherein said first gear has a non-circular pitch curve;

h) wherein said second gear is an external gear which is rigid about said fixed axis, and further wherein said second gear has a non-circular pitch curve;

i) wherein said first gear and said second gear having the gear ratio equal to the number of said lobes of said rotor; and j) wherein said rotor engagement device operates has a constant rolling radius upon a supporting surface.

20. The rotary engagement device of claim 19, wherein said pitch curve of said second gear is in the shape of an ellipse having a first focus positioned at said fixed axis and a second focus above said first focus.

21. The rotary engagement device claim 19, further including an lever coupled between said second gear an operationally adapted for skewing said gear about said fixed axis, thereby adjusting a phase incidence of said rotor upon said supporting surface.

22. The rotary engagement device of claim 19, wherein said periphery of said rotor is defined by at least three lobes.

23. The rotary engagement device of claim 22, wherein said first gear and said second gear are bifurcated.

24. The rotary engagement device of claim 19, wherein said periphery of said rotor is defined by at least four lobes.

25. The rotary engagement device of claim 24, wherein said first gear and said second gear are trifurcated.

* * * * *